Patented Nov. 14, 1944

2,362,648

UNITED STATES PATENT OFFICE 2,362,648

METHOD OF PREPARING CHEMICAL COMPOUNDS

Joy G. Lichty, Stow, and Nelson V. Seeger, Cuyahoga Falls, Ohio, assignors to Wingfoot Corporation, Akron, Ohio, a corporation of Delaware No Drawing. Application October 29, 1942, Serial No. 463,782

5 Claims. (Cl. 260—453)

This invention relates to the preparation of isocyanates and more particularly to the preparation of isocyanates from the corresponding amines by the use of a catalyst.

It has previously been known that isocyanates may be prepared by reacting a primary amine with phosgene. The amine is usually employed in the form of its hydrochloride, although the free amine has been used in some cases. In place of phosgene, materials which liberate phosgene during the reaction may also be used. These previously known methods have not been entirely satisfactory, however, since in some cases the yield is not sufficient and in others the time of reaction is unduly long.

One of the principal objects of the present invention is to produce isocyanates from the corresponding amines in good yields and in reasonable times by the use of a catalyst. Other objects and advantages will appear as the description proceeds.

According to the practice of the invention, the amine, which may be in the form of the free amine or the hydrochloride, is reacted with phosgene in the presence of a relatively small amount of a tertiary amine as a catalyst. Hydrogen chloride is eliminated and the amine is converted to the corresponding isocyanate. In general, the conditions of reaction as to temperature, pressure, proportions, etc. are similar to those previously employed without the catalyst but, by the use of the catalyst, the yields are improved and the time of reaction is greatly shortened.

The practice of the invention is illustrated by the following examples:

Example 1

One and one-half liters of toluene at room temperature were saturated with 300–400 grams of phosgene and then 198 grams (one mole) of p,p'-diamino-diphenylmethane (commercially sold as Tonox) dissolved in 500 cc. of toluene were added to the phosgene-toluene solution at 25–30° C. A light tan, crystalline solid separated. The slurry was heated gradually with stirring to about 110° C. and, at the same time, 18 cc. of dimethyl aniline were added drop by drop. Within an hour, the solid had almost disappeared. The solution was filtered and the toluene was distilled off, leaving 212.3 grams of crude methylene diphenyl diisocyanate (85.0% yield). This was distilled under reduced pressure. The purified material melted at 43° C.

Example 2

In another example 2850 grams of p,p'-diaminodiphenylmethane dissolved in three gallons of toluene were added to nine pounds of phosgene dissolved in 5 gallons of toluene. A light tan precipitate formed. While the slurry was gradually heated to reflux, 75 cc. of dimethyl aniline were added, hydrogen chloride coming off readily. The solvent was then distilled off, leaving 3372 grams of crude methylene-diphenyl diisocyanate (93.7% yield).

Example 3

Four hundred ninety grams of phosgene were dissolved in 2½ liters of toluene and then 10 cc. of dimethyl aniline were added to the solution. Keeping the temperature at about 35° C., a solution of 198 grams of p,p'-diaminodiphenylmethane in one liter of toluene was added with stirring. A light yellow precipitate formed. The temperature was gradually raised during a 3½ hour period to 110° C., hydrogen chloride being evolved. At the end of this period, no solid precipitate remained. The toluene was then distilled off, leaving 237.1 grams of crude methylene diphenyl diisocyanate (95% yield).

Example 4

The process was carried out as in Example 3 except that the phosgene solution, with the dimethyl aniline added, was heated to 60° C. and the p,p'-diaminodiphenylmethane solution was then added. The crude product weighed 184.3 grams (73.8% yield).

Example 5

To a solution of 50 grams of p,p'-diaminodiphenylmethane in 800 cc. of toluene were added 6 cc. of dimethyl aniline. The solution was raised to reflux temperature and gaseous phosgene was bubbled in. The crude product weighed 46.8 grams (74.5% yield).

In the foregoing examples, the amine was employed as the free amine. Examples 6 and 7 demonstrate the practice of the invention by partial or total conversion of the amine to the hydrochloride.

Example 6

One hundred grams of p,p'-diaminodiphenylmethane monohydrochloride were added to 1 liter of toluene. The solvent was then saturated with gaseous phosgene and the solution was slowly warmed to reflux temperature. During this time 6 cc. of dimethyl aniline were added drop by drop. Hydrogen chloride came off profusely and at the end of 1½ hours the solid had disappeared entirely and a clear toluene solution remained. After evaporating the toluene, 103 grams of crude methylene diphenyl diisocyanate were obtained. The same reaction, performed without dimethyl aniline, required 7½ hours for the solid to disappear.

*Example 7*

One thousand grams of p,p'-diaminodiphenylmethane dihydrochloride were added to 10 liters of toluene and the slurry was heated at reflux for 7 hours while gaseous phosgene was bubbled in. During this time, 82 cc. of dimethyl aniline were added drop by drop. Eight hundred seventy-two grams of crude methylene diphenyl diisocyanate were obtained. Without the catalyst, the reaction required 12–16 hours to react to give comparable yields.

In Examples 6 and 7, the monohydrochloride and dihydrochloride of p,p'-diaminodiphenylmethane were prepared in the same manner, except for a variation in the amount of hydrogen chloride added. Dry gaseous hydrogen chloride was passed into a toluene solution of diaminodiphenylmethane. A precipitate formed immediately and this was shown by analysis to be the monohydrochloride (15.1% chlorine). Further addition of hydrogen chloride gave the dihydrochloride (26.2% chlorine).

Various other aliphatic and aromatic primary amines may be substituted in the process for the p,p'-diaminodiphenylmethane of the examples. The aliphatic amines may be saturated or unsaturated, straight or branched chain, or cyclic, and ring-substituted aliphatic compounds, such as benzylamine, furfurylamine, tetrahydrofurfurylamine and the like are also included. Furthermore, the starting amines, whether aliphatic or aromatic, may comprise various substituent groups which do not enter into the reaction, such as nitro, alkoxy, halogen, etc. Further representative examples of amines which may be employed are tetramethylene diamine, hexamethylene diamine, octamethylene diamine, benzidine, the phenylene diamines, ethylene bis (3-aminopropyl ether), the naphthylamines, the naphthylene diamines, cyclohexylamine, allylamine, aniline, anisidine, phenetidine, the butylamines, isopropylamine, di-(3-aminopropyl) ether, etc.

Any other tertiary amine may be employed in place of the dimethyl aniline of the examples, including both aliphatic and aromatic amines. Again, the aliphatic amines may be saturated or unsaturated, straight or branched chain, or cyclic, or ring-substituted aliphatic, such as benzyl, furfuryl, tetrahydrofurfuryl and the like. Also, if desired, the tertiary amine may have mixed substituents. Further examples are tri-isobutyl amine, triphenyl amine, hexamethylene tetramine, N-methyl diphenylamine, dibenzyl aniline, etc.

Reaction may be carried out, if desired, under pressure in order to prevent the loss of materials, but as shown in the examples it may also be performed advantageously at atmospheric pressure. The temperature may vary from the minimum at which reaction occurs to a maximum above which the decomposition of the product takes place. In general, the temperature will be between about 40° C. and 200° C. and the reaction is readily and effectively carried out at about 60–110° C.

We claim:

1. In a process for preparing an organic isocyanate by reacting the amine corresponding thereto with phosgene, the improvement which comprises carrying out the reaction in the presence of a tertiary amine as a catalyst.

2. In a process for preparing an aromatic isocyanate by reacting the amine corresponding thereto with phosgene, the improvement which comprises carrying out the reaction in the presence of a tertiary amine as a catalyst.

3. In a process for preparing an aliphatic isocyanate by reacting the amine corresponding thereto with phosgene, the improvement which comprises carrying out the reaction in the presence of a tertiary amine as a catalyst.

4. In a process for preparing an organic isocyanate by reacting the amine corresponding thereto with phosgene, the improvement which comprises carrying out the reaction in the presence of dimethyl aniline as a catalyst.

5. In a process for preparing methylene diphenyl diisocyanate by reacting p,p'-diaminodiphenylmethane with phosgene, the improvement which comprises carrying out the reaction in the presence of a tertiary amine as a catalyst.

JOY G. LICHTY.
NELSON V. SEEGER.